Patented Apr. 22, 1947

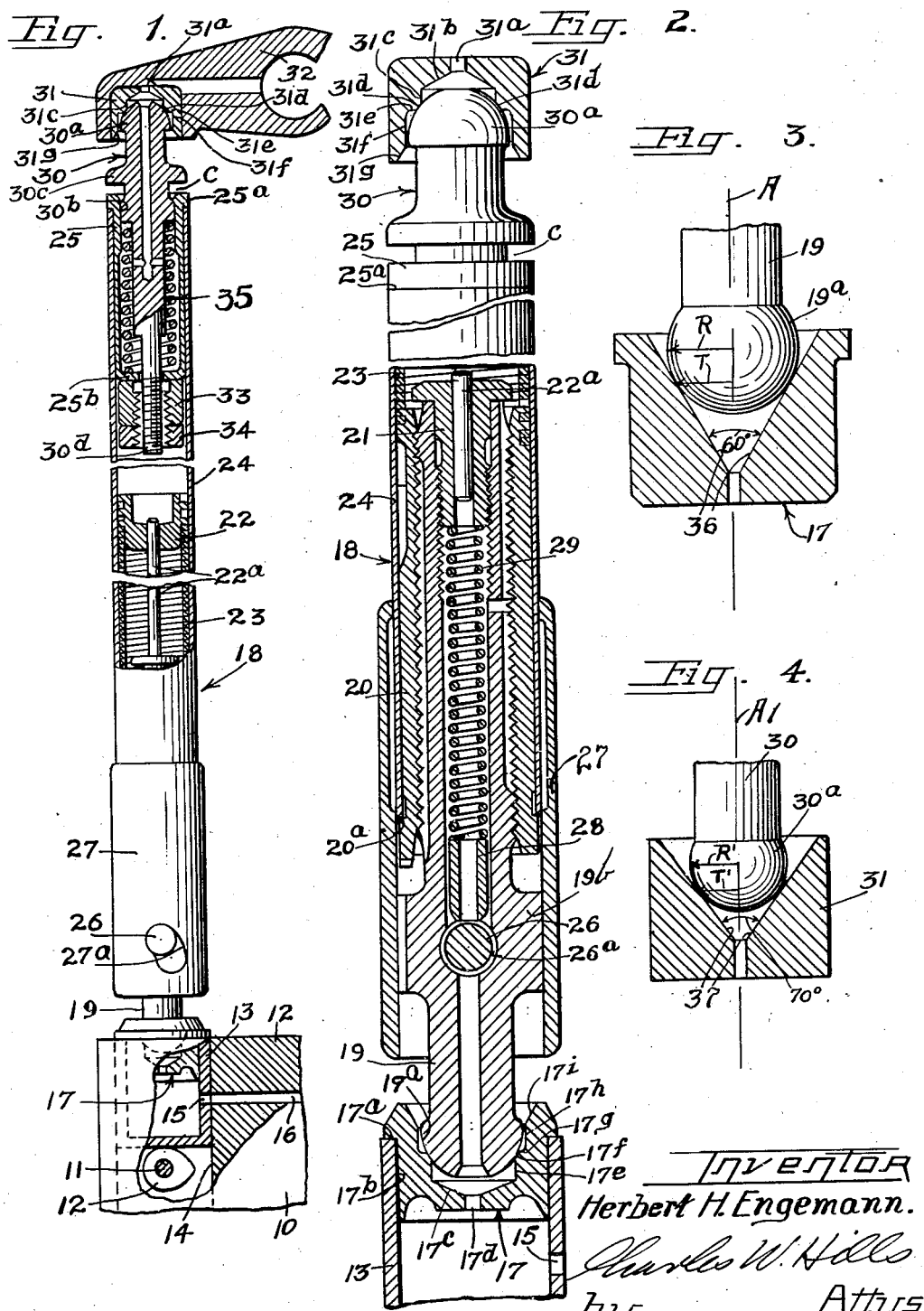

2,419,316

UNITED STATES PATENT OFFICE 2,419,316

ANTICRASHING DEVICE FOR AUTOMATIC PUSH RODS

Herbert H. Engemann, Cleveland Heights, Ohio

Application June 2, 1944, Serial No. 538,453

3 Claims. (Cl. 123—90)

This invention relates to rotation controllers for extensible and contractable links, and more specifically relates to ball seats for automatic push rods or tappet links between the cam shaft and poppet valves of internal combustion engines.

The invention will hereinafter be specifically described as embodied in a push rod assembly between the cam and poppet valve rocker of an internal combustion engine, but the invention is not limited to such usage, being generally adapted for control of the movements of rotating bodies.

According to the invention, an automatic push rod or tappet link having ball-ended screwed-together parts, a torsion spring for unscrewing the parts to elongate the rod or link, and an inertia hammer for screwing the parts together to shorten the rod or link, is equipped with ball seats rotatably mounting the rod or link between the cam shaft and poppet valve rocker arm of an internal combustion engine.

In push rods or tappet links of the type referred to, the thread between the screwed-together parts is subjected to compression loads during each valve-opening operation, and, unless there is appreciable friction resisting relative rotation of the parts, the rod or link does not transmit loads as a rigid member, but becomes foreshortened since the threads will "crash," or effect threading-together of the parts. Since the parts must rotate quite freely relatively to each other, high frictional resistance to rotation in an attempt to prevent crashing is not practical. The push rod or tappet link must, therefore, act as a load-transmitting member as well as a foreshortening or lengthening member to accommodate engine expansion and contraction.

In accordance with this invention, controlled frictional resistance to rotation of the screwed-together parts is obtained by ball cups which are designed to act as clutches for the ball ends of the rod or link. These ball cups allow rotation of the push rod or link, and thereby permit the torsion spring to lengthen the rod or link, and also permit the inertia hammer to shorten the rod or link.

In ball and socket joints it is customary to provide the ball socket with an inside dimension larger than the outside dimension of the ball seated therein, so that the ball can operate in the socket. Under axial compression loads in a push rod assembly, however, such ball and ball socket designs result in highly concentrated stresses due to substantially point contacts between the ball ends of the rods and the bottoms of the ball seats. The high stresses at substantial point contact areas cause galling and excessive wear of the cooperating parts, resulting in seizure preventing free rotation of the rod. If seizure does not result, the point contact relationship between the rod ends and the rod seats imparts substantially no resistance to rotation especially when the compressive loads on the rod are released, as during the valve-closing step, and crashing of the rod threads will occur.

In accordance with this invention, the ball seats are so designed as to have a ring contact with the ball ends of the rod which ring is struck from a radius providing a torque arm sufficient to impart enough resistance to rotation of the rod that crashing of the threads will not occur.

When a ball is seated in a circular seat of lesser diameter than the great diameter of the ball, a definite wedging action takes place and this action is determined by the angle defined by any two tangents to the contact line drawn through a diametrical plane of the ball. The wedging action is the same whether the ball is seated on the sharp edge of a hole or contacts a cone on the same diameter circle as the edge of the hole. The smaller the wedge angle the greater the clutching action on the ball. By increasing the ball seat diameter to very near the ball diameter a very pronounced clutching effect is obtained even though the seat diameter changes very little. But by increasing the ball diameter and leaving the wedging angle the same, greater torsional resistance is also obtained.

Since a very pronounced clutching effect is obtained as the ball seating diameter approaches the great ball diameter, I have found that to obtain a desired clutching effect at the ball ends of the push rod to prevent "crashing," the seat diameter of the ball should be one-quarter inch or larger in diameter, or that tangents to the opposite sides of the ball at the contacting ring in the ball diametrical plane should define an included angle of from 45° to 120°.

Another feature of the invention includes the provision of a spring-pressed operating clearance device in the push rod which insures seating of the ball ends of the rods in their sockets without causing the valve to open as, for example, when the engine is at rest and cooled down to decrease the distance between the rocker arm and the cam shaft. The automatic clearance device will accommodate decrease in this distance without rocking the shaft to open the valve even though the push rod itself cannot function to be foreshortened by the inertia hammer.

It is, then, an object of this invention to provide an automatic extensible and contractable linkage assembly involving a rotatably mounted link member which is mounted with sufficient resistance to rotation for preventing unauthorized shortening of the rod.

Another object of the invention is to provide ball cups for rotatable automatic push rods which impart controlled resistance to rotation of the rods.

A still further object of the invention is to provide clutches rotatably supporting an automatic push rod which impart sufficient resistance to rotation of the push rod to prevent unauthorized rotation.

A still further object of the invention is to provide a threaded-together automatic push rod assembly for valve linkages in internal combustion engines which has a rotatable mounting so designed that crashing of the threads is eliminated.

A still further object of the invention is to provide an automatic push rod having a spring-pressed ball-ended stud at one end and an inertia hammer-impelled ball-ended stud at the other end wherein the ball ends of both studs are seated in ball cups designed to impart a desired resistance to rotation of the rod studs.

A still further object of the invention is to provide a push rod having a spring-pressed operating clearance assembly cooperating to maintain ball ends of the rod in proper seating relation in specially designed sockets which impart predetermined resistances to rotation of the rod.

Other and further objects of the invention will be apparent to those skilled in the art from the following detailed description of the annexed sheet of drawings which, by way of preferred example only, illustrates one embodiment of the invention.

On the drawings:

Figure 1 is a fragmentary side elevational view, with parts in vertical cross section, of a valve linkage including a push rod according to this invention.

Figure 2 is an enlarged fragmentary and broken vertical cross-sectional view, with parts in elevation, of the assembly of Figure 1.

Figure 3 is a somewhat diagrammatic view illustrating the ball and socket assembly for the bottom of the push rod.

Figure 4 is a view similar to Figure 3 but illustrating the ball and socket assembly for the top of the push rod.

As shown on the drawings:

In Figure 1 the reference numeral 10 designates a portion of an internal combustion engine such as the main body of the engine. A cam shaft 11 is mounted in the engine portion 10 and carries a cam 12 acting on a cam follower 13 which is slidably mounted in a cylindrical bore 14 of the engine portion. The cam follower is hollow and has a bottom wall acted on by the cam 12 and a side wall slidable on the bore wall and apertured as at 15 to be aligned with an oil duct 16 during each reciprocal stroke imparted to the follower by the cam.

The open top of the cam follower 13 receives a ball cup 17 therein. This ball cup 17, as shown in Figure 2, has a shoulder 17a bottomed on top of the cam follower together with a main body portion 17b projecting into the cam follower to be snugly seated therein.

The cup 17 has a stepped well in the center thereof terminating in a conical bottom 17c which has an oil hole 17d therethrough communicating with the interior of the cam follower. A cylindrical side wall 17e extends upwardly from the bottom 17c to a relatively narrow segmental spherical shaped ring or band 17f.

The top portion of the band 17f is connected through a horizontal wall or shoulder 17g with a cylindrical vertical wall 17h of larger diameter than the wall 17e.

This cylindrical wall 17h has an outwardly beveled conical mouth 17i at the top of the cup.

An automatic push rod 18 has a stud 19 with a semi-ball end 19a extending into the cup 17 and seated on the band 17f thereof.

The stud 19 of the push rod 18 is threaded into a nut 20 and, in turn, receives in the upper end thereof a boss member 21 carrying in fixed relation therein the shank 22a of a torsion spring anchor 22. A torsion spring 23 has one end thereof anchored to the top of the nut 20 and the other end thereof anchored to the anochor member 22.

A tube 24 envelops the nut 20 and torsion spring 23 and is bottomed on a shoulder 20a of the nut at its bottom end and receives the shoulder 25a of a cup member 25 at its top end.

The stud 19 has an enlarged cylindrical portion 19b with a transverse hole therethrough receiving a pin 26 which projects at its ends into the slots 27a of an inertia hammer 27 which is slidable on the tube 24 and stud portion 19b. The pin 26 is held against endwise displacement by a plunger 28 which seats in a groove 26a formed in the central portion of the pin. The plunger 28 is held in position in this groove 26a by a coil spring 29 held under compression between the plunger and the bushing 21.

The cup member 25 has an apertured bottom wall 25b in spaced relation inwardly from the top of the tube 24. A stud 30 projects from the top end of the cup 25 and has a semi-ball end 30a seated in a ball cup 31 carried by the poppet valve rocker arm 32. The ball cup 31 has an oil hole 31a in the top thereof communicating with a conical wall 31b which diverges outwardly to a cylindrical wall 31c at the end of which is provided a segmental spherical narrow ring or band area 31d. A horizontal shoulder 31e extends outwardly from the band area to a cylindrical wall 31f with an outwardly tapered bottom mouth 31g. The ball end 30a is rotatably and rockably mounted on the fragmental spherical face of the band area 31d.

The stud 30 has a shank portion with a cylindrical piston head 30b thereon slidable in the cup 25 together with an outturned collar 30c spaced above the piston 30b and adapted to be bottomed on the cup 25. The shank of the stud 30 has a threaded reduced-diameter lower end portion 30d extending through the aperture in the bottom wall 25b of the cup and an adjustment nut 33 is threaded on the projecting end 30d into thrusting relation with the bottom wall 25b of the cup. A lock nut 34 cooperates with the adjusting nut 33 to hold the same in adjusted position.

A coil spring 35 is held under compression between the piston 30b and the bottom 25b and urges the adjustment nut 33 against the bottom wall 25b to move the collar 30c in spaced relation from the top of the cup 25. The space C between the collar 30c and the top of the cup 25 is controlled by the adjusting nut 33 and provides operating clearance for the assembly, as will be more fully hereinafter described.

The cam 12 pushes the cam follower 13 upwardly during the valve-opening stroke, and the push rod 18, during this upstroke, acts as a rigid member transmitting all movement of the cam follower 13 to the rocker arm 32 except for that small amount of movement represented by the clearance space C. During this upstroke the stud 30 does not move until the rod 18 pushes the cup 25 against the shoulder 30c of the stud. The spring 35 is materially weaker than the spring holding the valve in closed position, and therefore the rocker arm is not capable of being rocked by the force of the spring 35, and remains at rest until the operating clearance C is taken up. This operating clearance C is used to insure complete closing of the valve as will be hereinafter more fully described.

During the first part of the upstroke, when the push rod is positively accelerated and gains speed in an upward direction, the impact pin remains in the top parts of the hammer slots 27a, but at about the half-way open position for the valve, the push rod is decelerated, begins to lose speed, and the inertia hammer flies upward. During deceleration, the valve spring urging the valve to closed position holds the valve linkage in contact with the cam 12, but since the inertia hammer 27 is not restricted by valve spring force, it is free to fly upward during the upstroke deceleration.

As the valve reaches fully open position, the cam 12 begins to run away from under the tappet 13 and the valve spring force causes the push rod to increase in speed in a downward direction or be negatively accelerated. This action prevails until the valve is about half closed.

As long as the negative acceleration prevails, the inertia hammer 27 is trying to fly upward even though the valve is on the downstroke. However, at about the half-closed valve position, the push rod has reached its maximum downward velocity and is decelerated since the cam contour slows up the linkage and causes it to come to a stop at the full-closed valve position. The inertia hammer is free to keep on traveling at the accelerated speed to strike the pin a rotative blow. The length and curvature of the hammer slot is so designed that the hammer will impact the pin just after the valve has seated.

The rotative blow on the pin 26 screws the stud 19 into the nut 20 against the bias of the torsion spring 23 and any load on the valve linkage existing at that moment to shorten the push rod. The shortening of the rod will continue until the stored-up energy in the hammer is dissipated in winding up the torsion spring. Immediately after the hammer energy is spent, the torsion spring has ample time, before the next valve-opening cycle, to unwind and take up all play except the predetermined amount.

The operating clearance spring 35 is used mainly for permitting full seating of the valve after the rod 18 has been lengthened to accommodate expansion in a heated engine and after the engine has been idle for an appreciable time and has cooled down without permitting the rod to be foreshortened. If, for example, a hot engine is stopped with the rod 18 in a lengthened position and is started up only after it has been cooled, the rod would be too long to permit seating of the valve. The tappet clearance device functions to allow the valve to close in such conditions.

No corrective adjustment action takes place during the valve-opening or closing cycles and the torsion spring 23 is too weak to close up any of the constant clearance space.

In order to prevent unauthorized rotation of the stud 19 into the nut 20, as, for example, during the upstroke or valve-opening stroke, rotation of the push rod 18 must be controlled. The threads connecting the stud 19 and the nut 20 may become glazed in use and might "crash" under the compression forces exerted during the upstroke or load stroke of the engine permitting the rod to be foreshortened when it is necessary, during this stroke, that the rod act as a rigid motion-transmitting link. Such foreshortening of the rod is prevented, according to this invention, by controlling frictional resistance to rotation of the rod in its ball seats 17 and 31. These ball seats are so designed as to rockably and rotatably receive the ball ends of the push rods at points outwardly from the axial center of the ball ends but inwardly from the great circles of the ball ends so as to provide torsion arms of predetermined lengths.

For purpose of illustration, the cup 17 for the ball end 19a of the stud 19 has been greatly enlarged in Figure 3, and has been illustrated as having a conical bearing wall 36, tapered or inclined to define an included angle of 60°. Thus ball end 19a of the stud seats on the bearing wall 36 outwardly from the longitudinal axis A of the ball, but beneath or inwardly from the great circle of the ball. The bearing walls are tangent to the ball end 19a and a torque arm T shorter than the radius R of the ball is provided to resist rotation of the ball about the axis A. It will be seen that an increase in the included angle defined by the converging bearing wall will result in a decreased torque arm while a decrease in the included angle will result in an increased torque arm. Thus, for any given ball radius R, the torque arm T can be varied by variation of the included angle defined by the converging bearing wall receiving the ball.

In Figure 4, the top bearing cup 31 has been illustrated as having a conical bearing wall 37 tapered or inclined to define an included angle of 70°. The bearing walls 37 are tangent to the ball 30a of the top stud 30 and have ring contact with the ball in spaced relation outwardly from the axis A' of the ball but inwardly from the great circle of the ball. A torque arm T' shorter than the radius R' of the ball 30a resists rotation of the ball about the axis A'.

The ball 30a of the top stud 30 has a smaller radius R' than the ball 19a, but the difference in size relationship between radius R' and torque arm T' is greater than that between radius R and torque arm T.

It has been explained hereinabove that a perfect ball and ball socket seating relationship is not obtainable commercially, and that the conventional ball and socket joints have oversized sockets which, during axial compression loads between the stud and socket, receive the ball end of the stud in substantially point contact relationship, causing galling of the surfaces and uncontrollable resistance to rotation. According to this invention, contact between the ball and the ball socket is maintained over a ring or band area of the ball outwardly from the longitudinal axis of the ball stud but inwardly from the great circle of the ball end of the stud. As it is apparent from the drawings and the relationship of the ball and socket heretofore discussed, the width of such band area or bearing area is substantially less than the arcuate distance from a point on the horizontal great circle of the balls 19a and 30a of Figures 3 and 4 respectively to the lowermost point on such balls. Specifically, as shown in the drawings, the width of the annular spherical segment bearing area is substantially less than one-fourth the circumference of the great circle of the ball ends. Hence the torque arm acting on the ball is predetermined by the included angle of the socket bearing wall or band, considering the arcuate width of such band to be coincident with the chordal width and the projections of diametrically opposed chordal widths to define the included angle. The larger included angles increase the stress relationship between the ball and ball socket since the ball bears on the socket closer to the ball axis and approaches a point contact relation. At the same time, however, the torque arm is decreased and friction resisting rotation is less.

The smaller included angles provide band surfaces which contact the ball end outwardly from the axis, thereby increasing the length of the torque arm.

Included angles of from 45 to 120° provide low stresses on the assembly, and act as an efficient compromise between the high and low limits. The seat diameter of the ball should be ¼" or larger. In every case, the effective torque arm is selected to provide sufficient frictional torque in opposition to relative movement of the ball end with respect to its annular socket seat to prevent thread crashing of the push rod under the compression forces existing during normal operation of a valve operating linkage associated with the push rod.

From the above description it will, therefore, be understood that this invention provides anti-crashing devices for rotatable push rods having automatic extensible and contractable means, which devices impart controlled resistances to rotation of the push rods.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A push rod assembly comprising a push rod having male and female threaded parts, one of said parts having a ball end, a bearing cup receiving said ball end in tiltable and rotatable relationship, said bearing cup having an annular spherical segment socket wall, said annular socket wall having a width substantially less than one-fourth the great circle circumference of said ball end and disposed in annular engagement with the ball end to provide an effective torque arm of predetermined length for the frictional resistance between said ball end and bearing cup in opposition to rotation of the ball end with respect to said bearing cup, said effective torque arm being sufficient to prevent crashing of said threads of said male and female parts during the normal compression stroke of the push rod.

2. The combination defined in claim 1 wherein said bearing cup has stepped inside walls defining a shoulder therebetween and said annular spherical segment socket wall is formed on the inner edge of said shoulder.

3. A valve operating assembly comprising an extensible and contractible push rod having male and female threaded parts, each of said parts having a ball end secured thereto, a pair of spaced link members defining bearing cups respectively receiving said ball ends in tiltable and rotatable relationship, each of said bearing cups having a spherical segment ring seat, the width of said ring seat being substantially less than one-fourth the great circle circumference of the respective ball end and the mean radius of the ring seat being selected to provide a predetermined torque arm for the frictional resistance between each link member and the respective ball end in opposition to rotation of said parts with respect to said link members, said predetermined torque arm being sufficient to prevent crashing of said threads of said male and female parts during the normal compression stroke of the push rod.

HERBERT H. ENGEMANN.

REFERENCES CITED

The following references are of record in the file of this patent:

UNITED STATES PATENTS

| Number | Name | Date |
| --- | --- | --- |
| 1,607,128 | Johansen | Nov. 16, 1926 |
| 2,167,895 | Engemann | Oct. 24, 1939 |
| 1,443,940 | Anderson | Feb. 6, 1923 |
| 2,308,858 | Burkhardt | Jan. 19, 1943 |
| 2,259,905 | Moncrieff | Oct. 21, 1941 |
| 1,905,888 | Berry | Apr. 25, 1933 |
| 1,624,497 | McAllister | Apr. 12, 1927 |